US010283157B2

(12) United States Patent
Hoshi et al.

(10) Patent No.: US 10,283,157 B2
(45) Date of Patent: May 7, 2019

(54) OPTICAL PICKUP

(71) Applicant: Panasonic Intellectual Property Management Co., Ltd., Osaka (JP)

(72) Inventors: Seiji Hoshi, Osaka (JP); Noriaki Terahara, Osaka (JP); Fumitomo Yamasaki, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/888,397

(22) Filed: Feb. 5, 2018

(65) Prior Publication Data
US 2018/0268856 A1    Sep. 20, 2018

(30) Foreign Application Priority Data

Mar. 14, 2017  (JP) .................................. 2017-048080

(51) Int. Cl.
| | | |
|---|---|---|
| *G11B 7/125* | (2012.01) | |
| *G11B 7/1365* | (2012.01) | |
| *G11B 7/1267* | (2012.01) | |
| *G11B 7/22* | (2006.01) | |

(52) U.S. Cl.
CPC .......... *G11B 7/1365* (2013.01); *G11B 7/1267* (2013.01); *G11B 7/22* (2013.01)

(58) Field of Classification Search
CPC ... G11B 7/131; G11B 7/13; G11B 2007/0006; G11B 7/1205; G11B 7/127; G11B 7/0032
USPC ............................ 369/44.37, 120, 121, 122
See application file for complete search history.

(56) References Cited

U.S. PATENT DOCUMENTS

| | | | | |
|---|---|---|---|---|
| 2005/0025030 A1* | 2/2005 | Nakamura | ............... | G11B 7/22 369/112.15 |
| 2009/0138901 A1* | 5/2009 | Tanaka | ................. | G11B 7/1392 720/659 |
| 2009/0141614 A1* | 6/2009 | Tanaka | ................. | G11B 7/1398 369/112.01 |

FOREIGN PATENT DOCUMENTS

| | | |
|---|---|---|
| JP | 60-167130 | 8/1985 |
| JP | 8-224905 | 9/1996 |
| JP | 2000-155952 | 6/2000 |
| JP | 2009-111109 | 5/2009 |
| JP | 2013-16226 | 1/2013 |

* cited by examiner

*Primary Examiner* — Nabil Z Hindi
(74) *Attorney, Agent, or Firm* — Wenderoth, Lind & Ponack, L.L.P.

(57) ABSTRACT

An optical pickup includes an optical base mounted with at least one optical element, a light source that supplies light incident on the at least one optical element, and a tilt spacer that is disposed between the light source and the optical base to adjust a characteristic of the light that enters the optical base. With the characteristic of the light that enters the optical base adjusted by the tilt spacer, the optical base and the light source are fixed directly to each other.

8 Claims, 11 Drawing Sheets

OPTICAL PICKUP

BACKGROUND

1. Technical Field

The present disclosure relates to an optical pickup that performs recording, erasing, and reproduction on an optical disk.

2. Description of the Related Art

Mounting a semiconductor laser to an optical base of an optical pickup to have an optical axis as designed is a critical challenge in production of the optical pickup. To solve this challenge, in PTL 1, a semiconductor laser is fixed to a laser diode (LD) holder formed with a spherical or arcuate surface that is centered around an emission point of the semiconductor laser, and the LD holder is fitted to a similarly formed spherical or arcuate surface of an optical base or an optical axis adjustment holder for rotational adjustment and X-Y adjustment of the semiconductor laser. In this way, light power distribution adjustment and optical axis tilt adjustment are carried out.

CITATION LIST

Patent Literature

PTL 1: Unexamined Japanese Patent Publication No. 2000-155952

SUMMARY

With explosively increasing digital data in markets in recent years, storage devices such as a hard disk and a semiconductor memory increasingly have larger capacities and are required to store data for a fixed period of time or more. As such, there is a move toward reconsideration of an optical disk that conventionally has recorded mainly music, video and the like as a device for storing long-term storage data because of the optical disk's long-term storage property, low bit unit price, and maintainability.

Thus, in tandem with higher density of the optical disk than ever, further miniaturization, higher precision, and long-term reliability are prerequisites for an optical pickup that performs recording/reproduction on the optical disk. To achieve recording/reproduction with higher density than ever, a light spot on an optical disk recording surface needs to be smaller, a light power distribution (hereinafter described as a far-field pattern (FFP)) needs to be free of deviation, and an optical axis of light emitted from a semiconductor laser needs to be aligned with a peak point of the FFP and needs to be perpendicularly incident on the optical disk.

Figure 9:
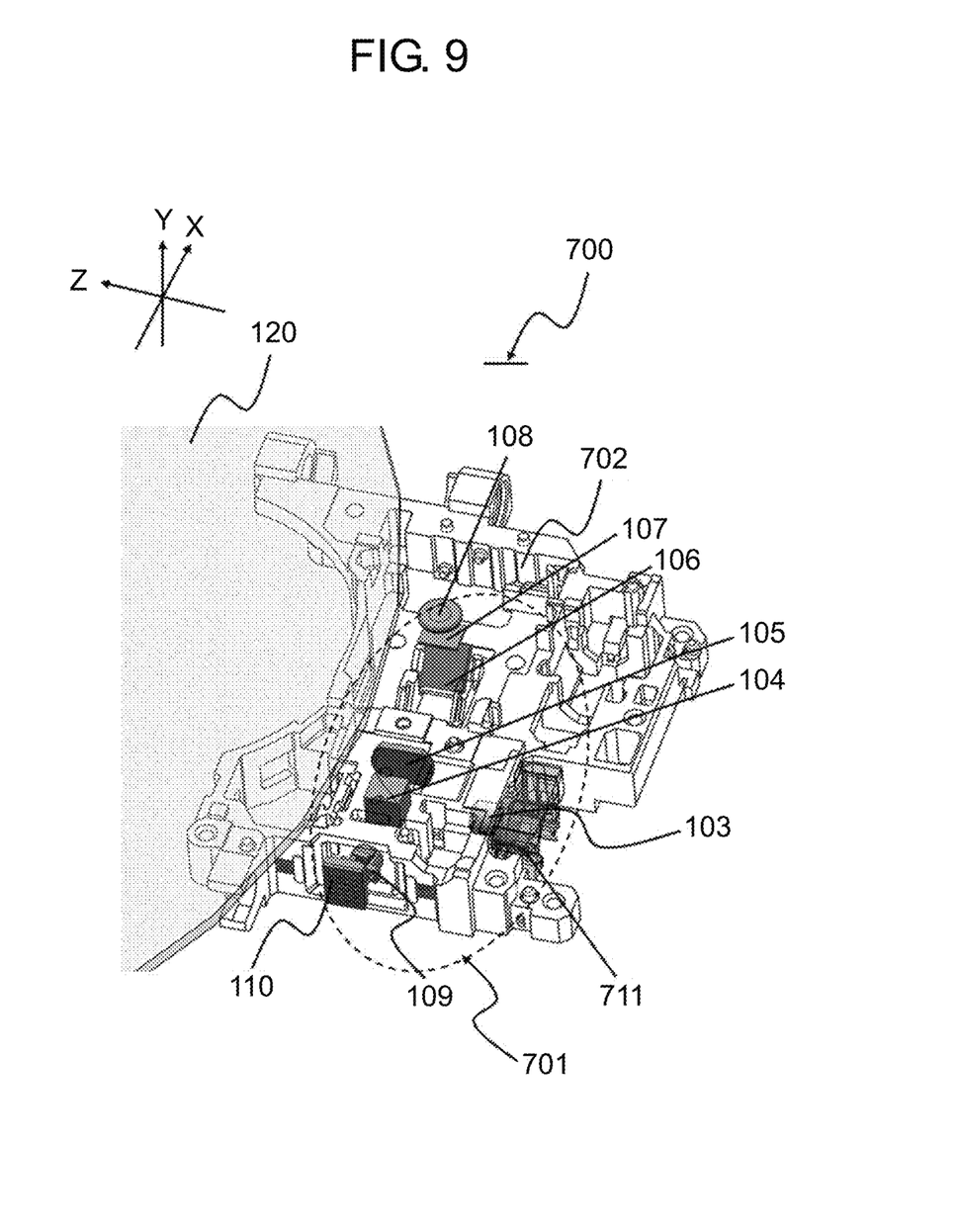
FIG. 9 illustrates structure of an optical pickup in a conventional example.
Figure 10:
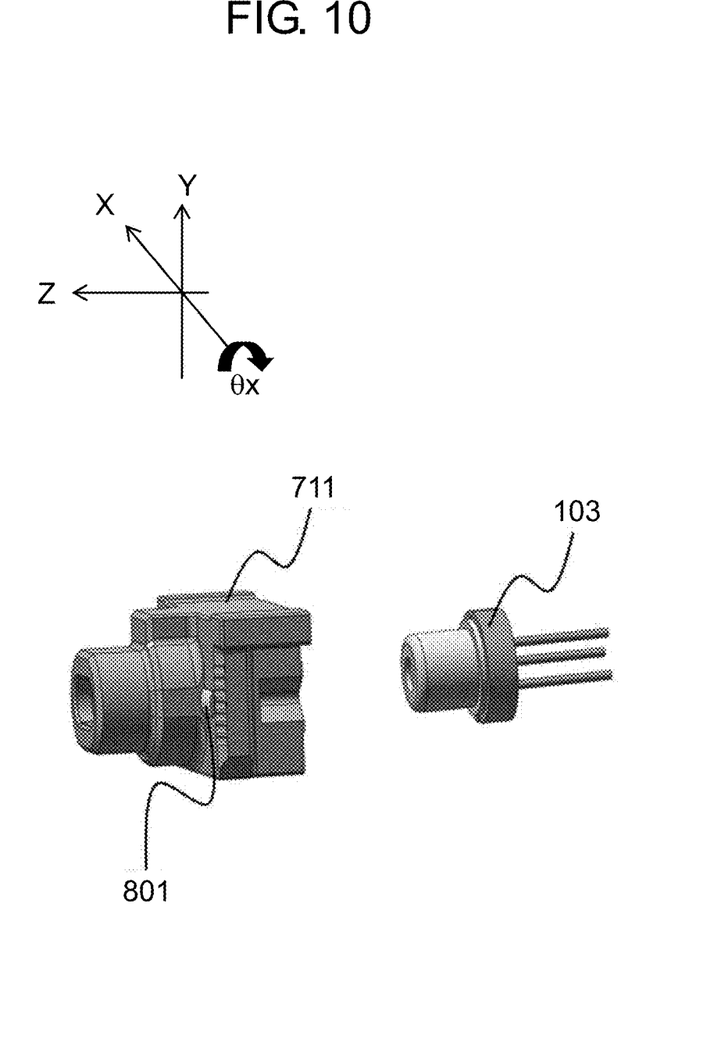
FIG. 10 illustrates structure of a semiconductor laser holder in the conventional example.

FIG. 9 illustrates structure of an optical pickup in a conventional example. In optical pickup 701 that is used in conventional optical disk drive 700, semiconductor laser 103 is fixed to semiconductor laser holder 711. As shown in FIG. 10, semiconductor laser holder 711 is provided with arc-shaped convex surface 801. An angle of contact with optical base 702 into which semiconductor laser holder 711 is inserted is adjusted at arc-shaped convex surface 801. In this way, rotational adjustment or X-Y adjustment of semiconductor laser holder 711 is carried out. This results in FFP adjustment and optical axis adjustment in optical pickup 701. In this method, however, because of being fixed to optical base 702 by bonding via semiconductor laser holder 711, semiconductor laser 103 easily gets out of position in a long-term reliability test, so that there are problems in miniaturization and securement of long-term reliability.

Figure 11:
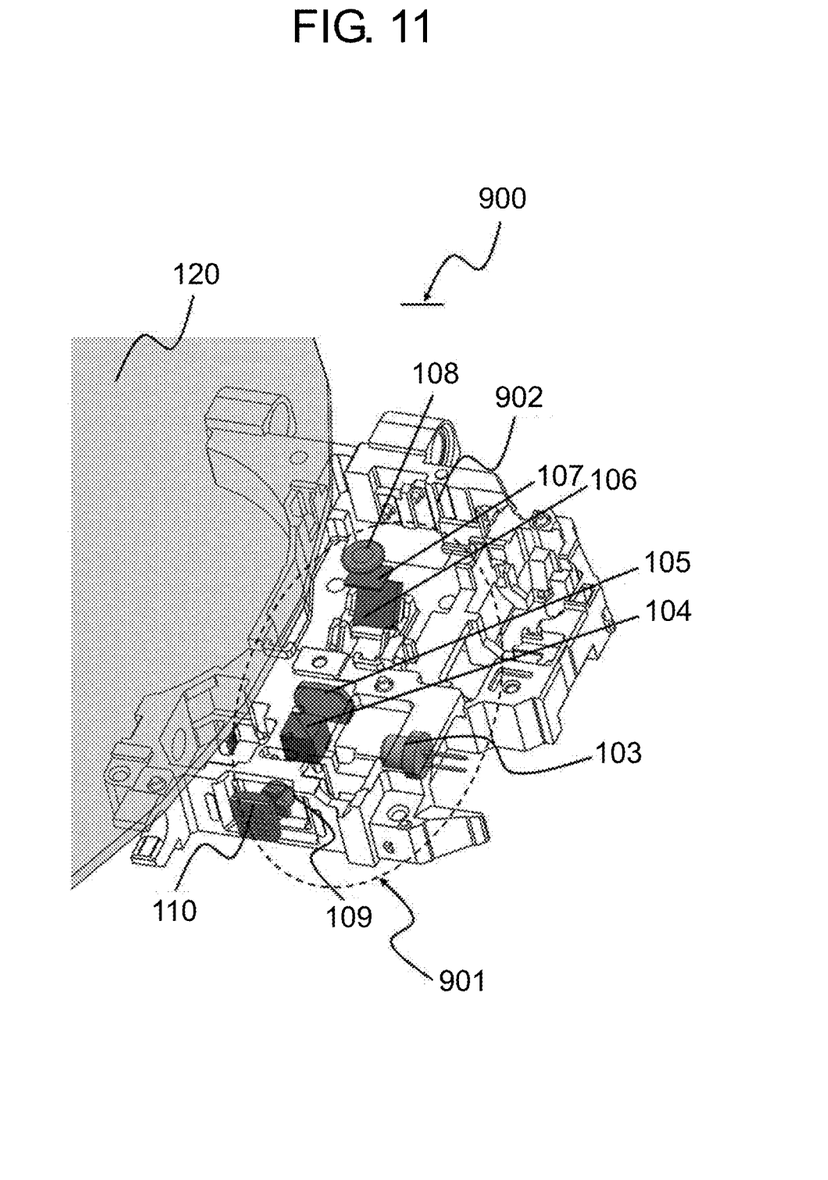
FIG. 11 illustrates structure of an optical pickup in another conventional example.

A measure such as below is taken against the above problems. Semiconductor laser 103 that has a smaller shift of an optical axis and a smaller shift of the FFP is selectively used and is fixed directly to optical base 902 (FIG. 11). Optical pickups 901 thus assembled undergo test selection, and those that are satisfactory are used. However, semiconductor lasers 103 and optical pickups 901 that are not selected are problematically wasted in this method.

Based on the above problems, the present disclosure aims to provide a smaller optical pickup with higher precision and long-term reliability.

An optical pickup disclosed in the present application includes an optical base mounted with at least one optical element, a light source that supplies light incident on the at least one optical element, and a tilt spacer that adjusts a characteristic of the light that enters the optical base, the tilt spacer being disposed between the light source and the optical base. With the characteristic of the light that enters the optical base adjusted by the tilt spacer, the optical base and the light source are fixed directly to each other.

In comparison with conventional optical pickups, an optical axis of the light source, for example, can thus be adjusted with respect to the optical base, and because the light source is fixed directly to the optical base by, for example, bonding after the adjustment, improved reliability can be achieved for this fixed part.

The optical pickup of the present disclosure that can be provided has higher precision and long-term reliability.

Arcuate surfaces that allow rotation of a semiconductor laser are respectively formed along two axial directions at respective edges of the tilt spacer of substantially cylindrical shape. The optical base is provided with a stepped hole into which the tilt spacer and the semiconductor laser are inserted, and the stepped hole has such a hole diameter as to form not less than a given clearance with the tilt spacer as well as with the semiconductor laser. The tilt spacer of substantially cylindrical shape has such an inside diameter as to form not less than a given clearance with an outer periphery of a cap of the semiconductor laser. An optical axis tilt and an FFP of the semiconductor laser can thus be adjusted along the two axial directions.

A middle of the arcuate surface of an arc-shaped projection that is formed on the tilt spacer's end face (a light-source-end counterface) and abuts on the semiconductor laser's stem having a mounting reference surface is substantially aligned with an emission point of the semiconductor laser, so that a shift of the emission point that might be caused by rotation of the semiconductor laser can be minimized, and FFP adjustment effected by the rotation and optical axis adjustment effected by the movement can be carried out without interference.

The arcuate surface of an arc-shaped projection that is formed on the tilt spacer's end face (an optical-base-end counterface) opposite from the light-source-end counterface is formed to make contact with the semiconductor laser's emission plane including the emission point. A bottom face of the stepped hole provided in the optical base is aligned with the emission plane. A radius of the arcuate surface is made as large as possible. A shift of the emission point that might be caused by rotation of the semiconductor laser can thus be minimized, and FFP adjustment effected by the rotation and optical axis adjustment effected by the movement adjustment can be carried out without interference.

The respective arcuate surfaces of the arc-shaped projections respectively formed on the counterfaces provided at the respective edges of the tilt spacer of substantially cylindrical shape are such that, for example, a direction of the arcuate surface at the light-source-end counterface is a longitudinal mode direction (θ⊥) of a semiconductor laser beam, while a direction of the arcuate surface at the optical-base-end counterface is a transverse mode direction (θ∥) of the semiconductor laser beam, whereby interference with an FFP that might be caused by rotation along the two axial directions can be minimized. As such, a substantial improvement in ease of work can be achieved. It is to be noted that respective directions of the arcuate surfaces are not limited to the above condition. There is no problem even when, for example, the direction of the arcuate surface making contact with the stem of the semiconductor laser may be a main shaft-countershaft direction of the optical pickup, while the direction of the opposite arcuate surface is an inner periphery-outer periphery direction of the optical pickup.

Since the semiconductor laser can be fixed directly to the optical base, which has other optical components, mechanism components, and others fixed, after the FFP adjustment and the optical axis adjustment of the semiconductor laser, deformation, deterioration and others of the optical base that might be caused by, for example, temperature, humidity, external force, and impact are dispersed. Accordingly, influence on the individual components can be minimized, and consequently, the optical pickup can have excellent reliability.

DETAILED DESCRIPTION

Exemplary embodiments are hereinafter described in detail with reference to the accompanying drawings where appropriate. However, detailed descriptions that are more than necessary may be omitted. For example, there are cases where detailed descriptions of well-known matters and repeated descriptions of substantially identical configurations are omitted. This is to avoid unnecessary redundancy in the following descriptions and to facilitate understanding by those skilled in the art.

The inventor(s) of the present disclosure provide the accompanying drawings and the following descriptions to help those skilled in the art to fully understand the present disclosure and thus do not intend to limit the subject matter defined in the appended claims thereby.

First Exemplary Embodiment

Figure 1:
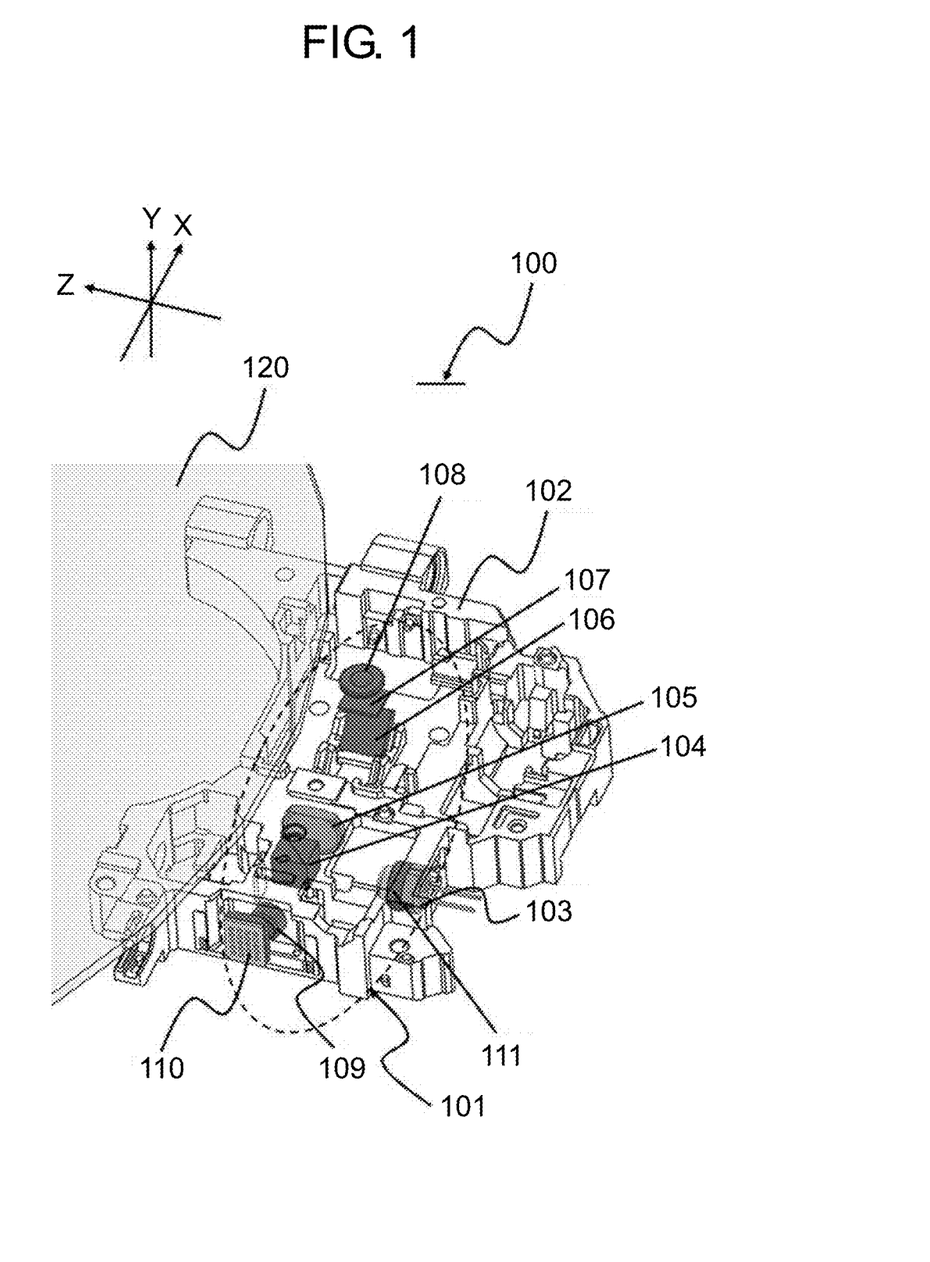
FIG. 1 is a perspective external view of an optical pickup according to a first exemplary embodiment.

FIG. 1 is a perspective external view of an optical pickup according to a first exemplary embodiment. In FIG. 1, light emitted from semiconductor laser 103 has its traveling direction bent by polarization beam splitter 104 and then is converted to collimated light by collimator lens 105. The collimated light is bent perpendicularly toward optical disk 120 by laser mirror 106 and passes through quarter-wave plate 107. By passing through quarter-wave plate 107, the light changes from linearly polarized light to circularly polarized light. The circularly polarized light is concentrated by objective lens 108 to be incident as a minute light spot on a recording surface of optical disk 120. In this way, information can be recorded on, erased from or reproduced by optical disk 120.

The light incident on optical disk 120 is reflected off the recording surface. The light reflected from optical disk 120 travels in a direction opposite to an optical path of the light incident on optical disk 120 from semiconductor laser 103 and repasses through quarter-wave plate 107, thereby becoming linearly polarized light in a direction perpendicular to a polarized direction of the incident light. Because of this characteristic, the reflected light is separated from the optical path of the incident light when passing through polarization beam splitter 104 and is concentrated by detection lens 109 to be guided to photodetector 110. At this photodetector 110, for example, focus error signal FE is detected by an astigmatic method, track error signal TE is detected by a push-pull method, and information signal RF is detected as data read from optical disk 120.

In order to make the following description of the exemplary embodiment easy to understand, a direction in which semiconductor laser 103 emits light is described as a Z direction, a direction that is perpendicular to the Z direction and is substantially parallel to the recording surface of optical disk 120 is described as an X direction, and a direction perpendicular to both the X direction and the Z direction is described as a Y direction. Directions that are opposite are described as a Z-minus direction, an X-minus direction, and a Y-minus direction, respectively.

Figure 2:
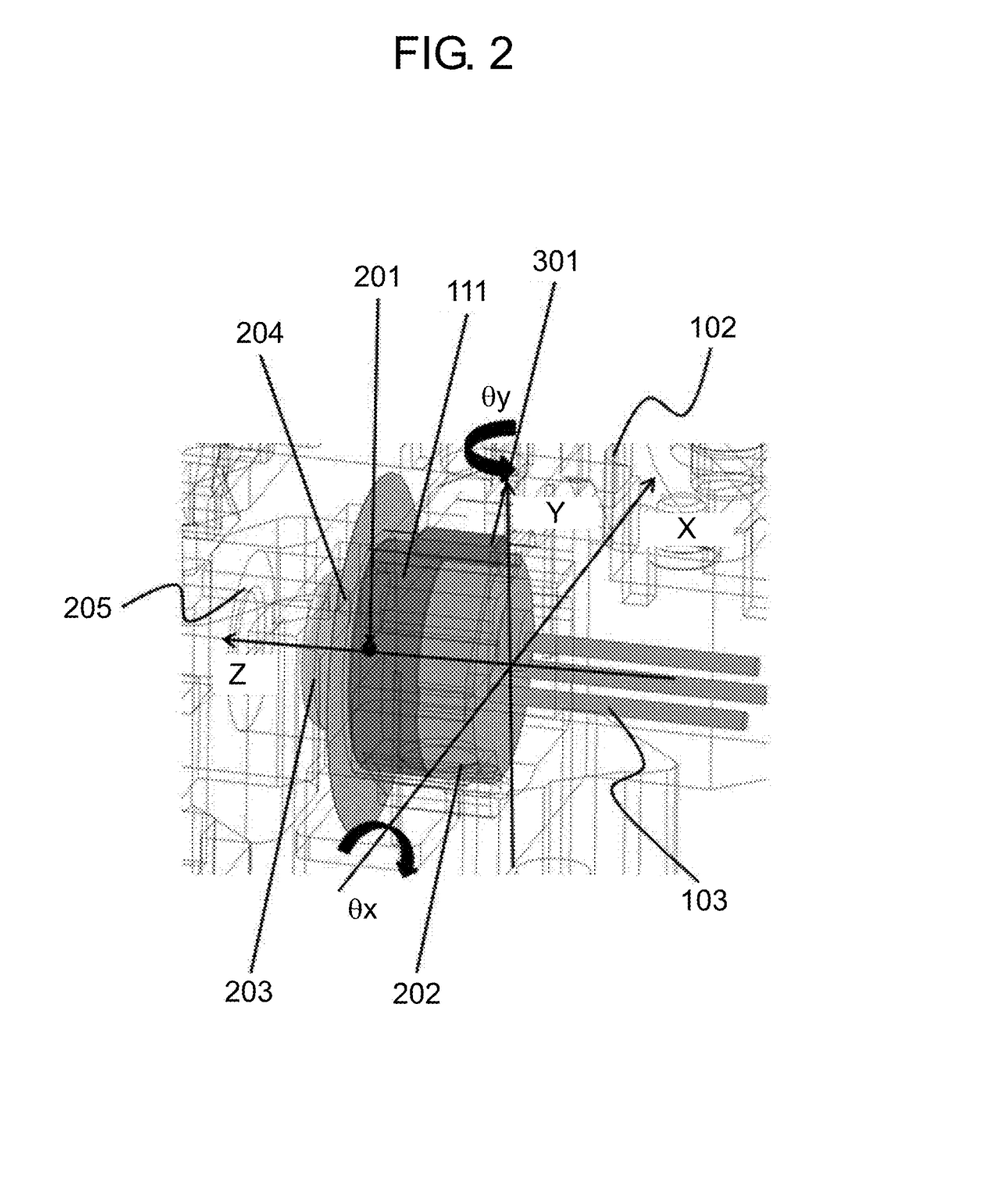
FIG. 2 is a see-through diagram with a semiconductor laser and a tilt spacer assembled to an optical base.

FIG. 2 is a see-through diagram with semiconductor laser 103 and tilt spacer 111 assembled to optical base 102. Semiconductor laser 103 is inserted into tilt spacer 111 at a side having key projection 301. Cap 203 of semiconductor laser 103 passes through a hollow part of tilt spacer 111 and projects at an optical-base side of tilt spacer 111. A projecting amount of cap 203 of semiconductor laser 103 is determined by contact between stem 202 of semiconductor laser 103 and a contact surface of tilt spacer 111.

Semiconductor laser 103 assembled to tilt spacer 111 is inserted into optical base 102. Optical base 102 has stepped hole 205 into which tilt spacer 111 assembled with semiconductor laser 103 is inserted. An optical-base-end contact surface of tilt spacer 111 makes contact with a receiving face of this stepped hole 205. Tilt spacer 111 having semiconductor laser 103 is thus assembled to optical base 102.

Emission point 201 indicates a logical emission position when semiconductor laser 103 emits light. Emission plane 204 is a logical plane where light emission is uniform when the light is emitted by semiconductor laser 103.

Figure 3:
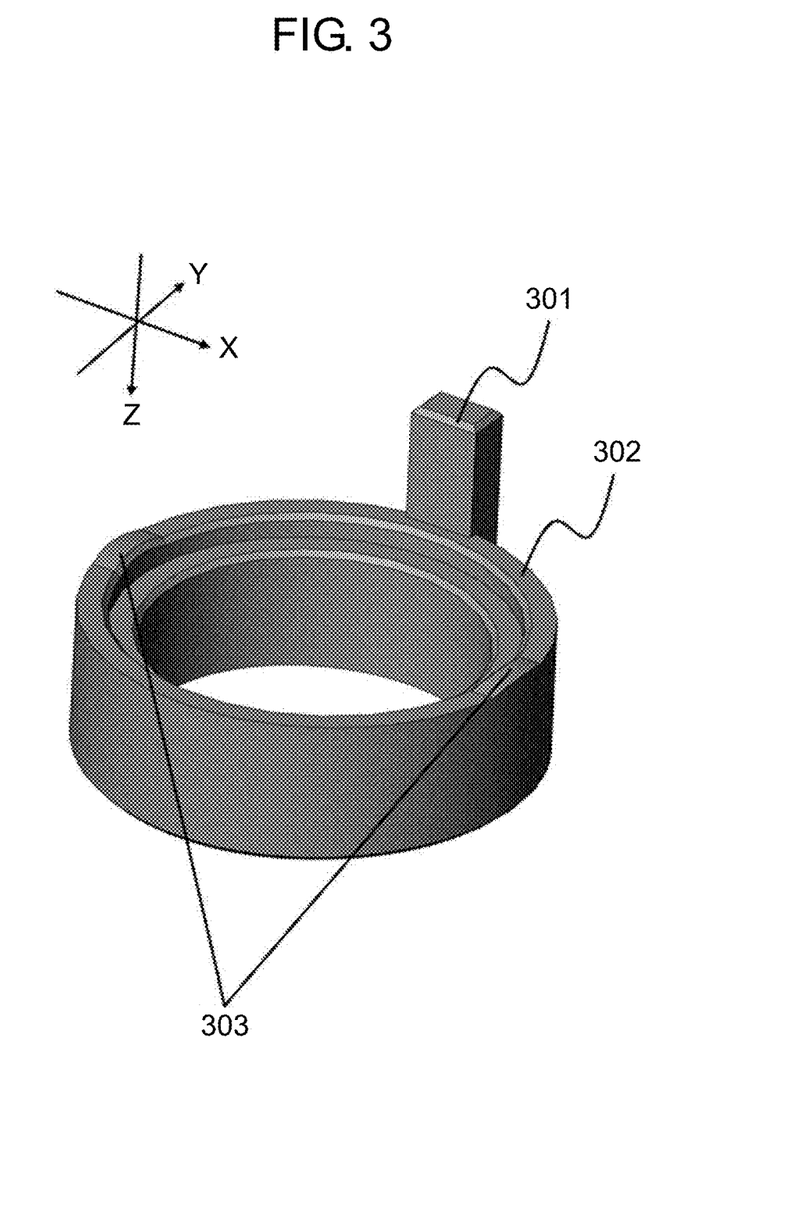
FIG. 3 illustrates a semiconductor-laser-end contact surface of the tilt spacer.

FIG. 3 illustrates the semiconductor-laser-end contact surface of tilt spacer 111. Tilt spacer 111 includes, on its side where tilt spacer 111 makes contact with semiconductor laser 103, semiconductor-laser-end counterface 302, key projection 301, and semiconductor-laser-end arc-shaped projections 303. Tilt spacer 111 has a substantially cylindrical shape.

Semiconductor-laser-end counterface 302 is one of two sides that define a cylindrical part of tilt spacer 111 having a substantially cylindrical shape. Semiconductor-laser-end counterface 302 is substantially planar and faces stem 202 of semiconductor laser 103.

Key projection 301 suppresses relative rotational position shifts of tilt spacer 111 and semiconductor laser 103 around a Z-axis. Key projection 301 is formed at an outer periphery of tilt spacer 111 so as to fit into a key groove formed in an outer periphery of stem 202 of semiconductor laser 103 and also to fit into a key groove formed in optical base 102.

Each of semiconductor-laser-end arc-shaped projections 303 is a bulging part of semiconductor-laser-end counterface 302. It is preferable that a middle of an arcuate surface of this semiconductor-laser-end arc-shaped projection 303 be substantially aligned with emission point 201.

Figure 4:
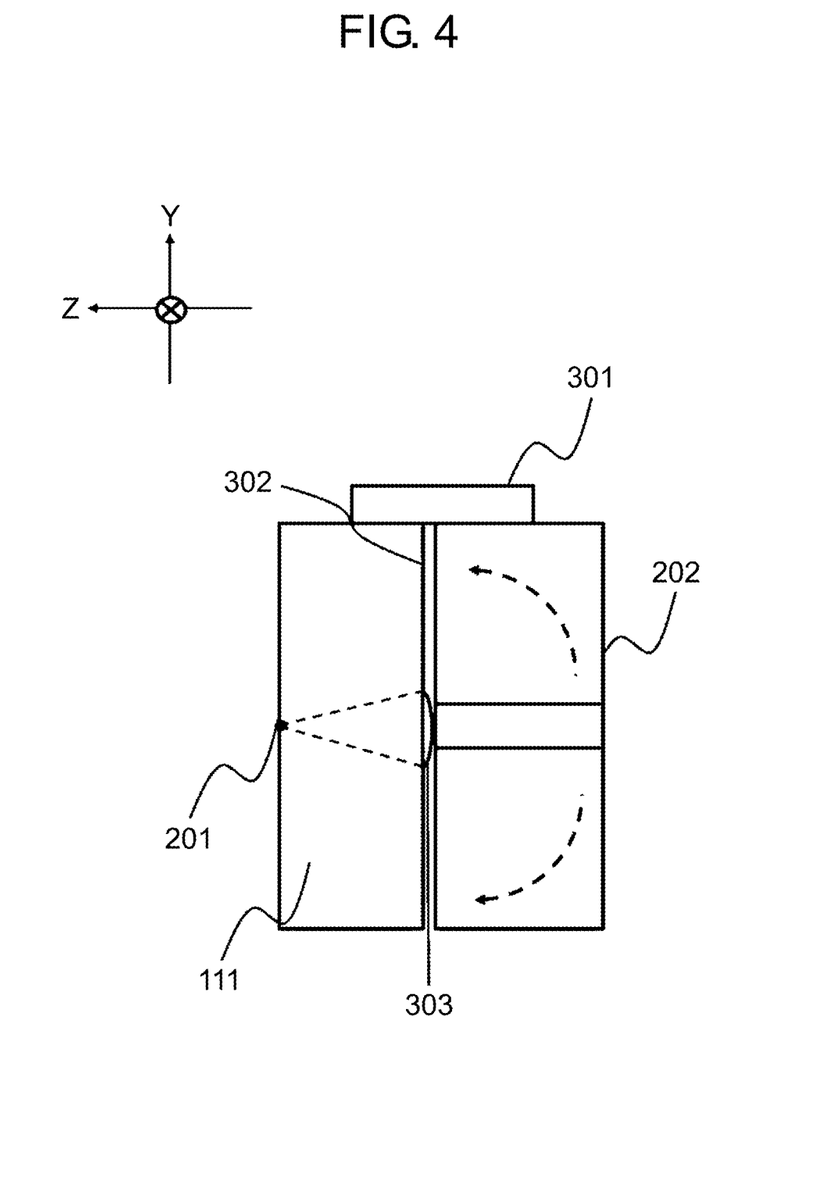
FIG. 4 is an enlarged view of a contact part between the tilt spacer and a stem of the semiconductor laser.

FIG. 4 is an enlarged view of a contact part between tilt spacer 111 and stem 202 of semiconductor laser 103. As shown in FIG. 4, tilt spacer 111 and semiconductor laser 103 make contact with each other at key projection 301 and semiconductor-laser-end arc-shaped projections 303. Semiconductor-laser-end counterface 302 faces a Z-side face of stem 202 of semiconductor laser 103 but does not make contact in its entirety.

Semiconductor laser 103 can be angularly adjusted around emission point 201, which is located at a middle of semiconductor-laser-end arc-shaped projections 303 of tilt spacer 111, with respect to tilt spacer 111 within a predetermined range on a Y-Z plane. By abutting on semiconductor-laser-end arc-shaped projections 303, semiconductor laser 103 has its further projection from the optical-base side (in the Z direction) of tilt spacer 111 controlled.

Figure 5:
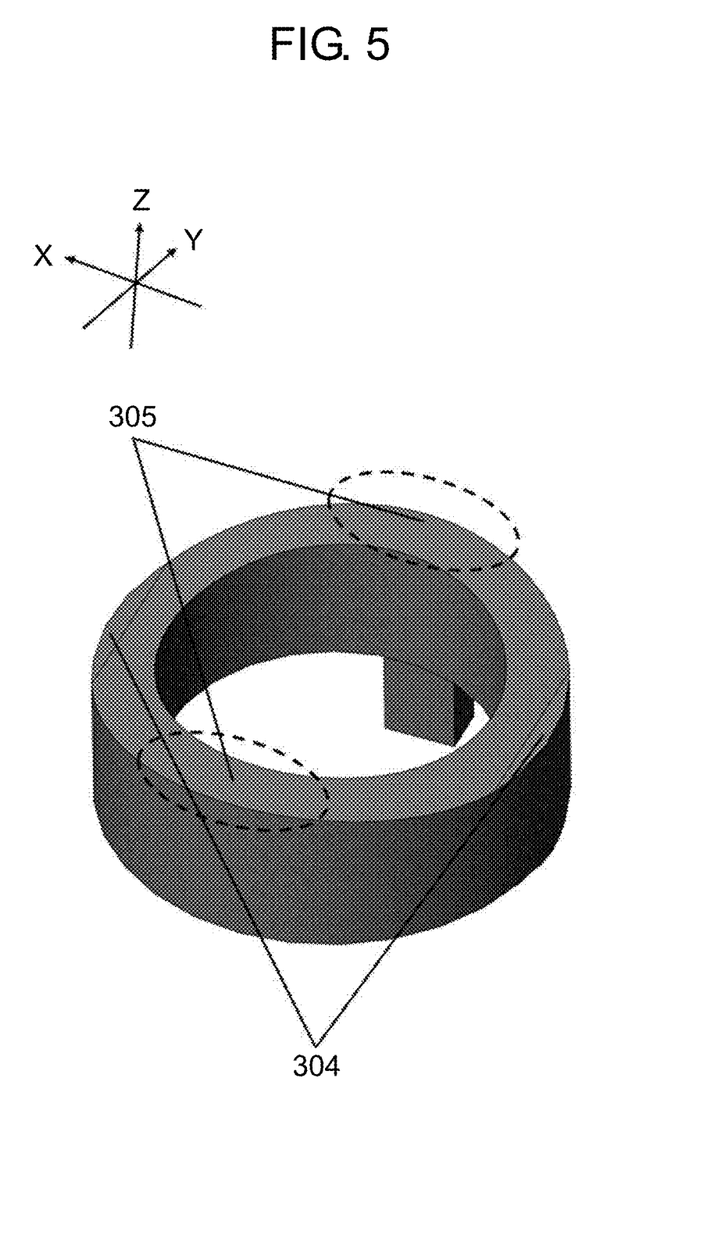
FIG. 5 illustrates an optical-base-end contact surface of the tilt spacer.

FIG. 5 illustrates the optical-base-end contact surface of tilt spacer 111. Tilt spacer 111 includes, on its side where tilt spacer 111 makes contact with optical base 102, optical-base-end counterface 304 and optical-base-end arc-shaped projections 305.

Optical-base-end counterface 304 faces the receiving face of stepped hole 205 provided in optical base 102.

Each of optical-base-end arc-shaped projections 305 is a bulging part of optical-base-end counterface 304. Similarly to semiconductor-laser-end arc-shaped projection 303, optical-base-end arc-shaped projection 305 rises from the counterface. However, optical-base-end arc-shaped projection 305 bulges in a more extensive area as compared with semiconductor-laser-end arc-shaped projection 303.

Figure 6:
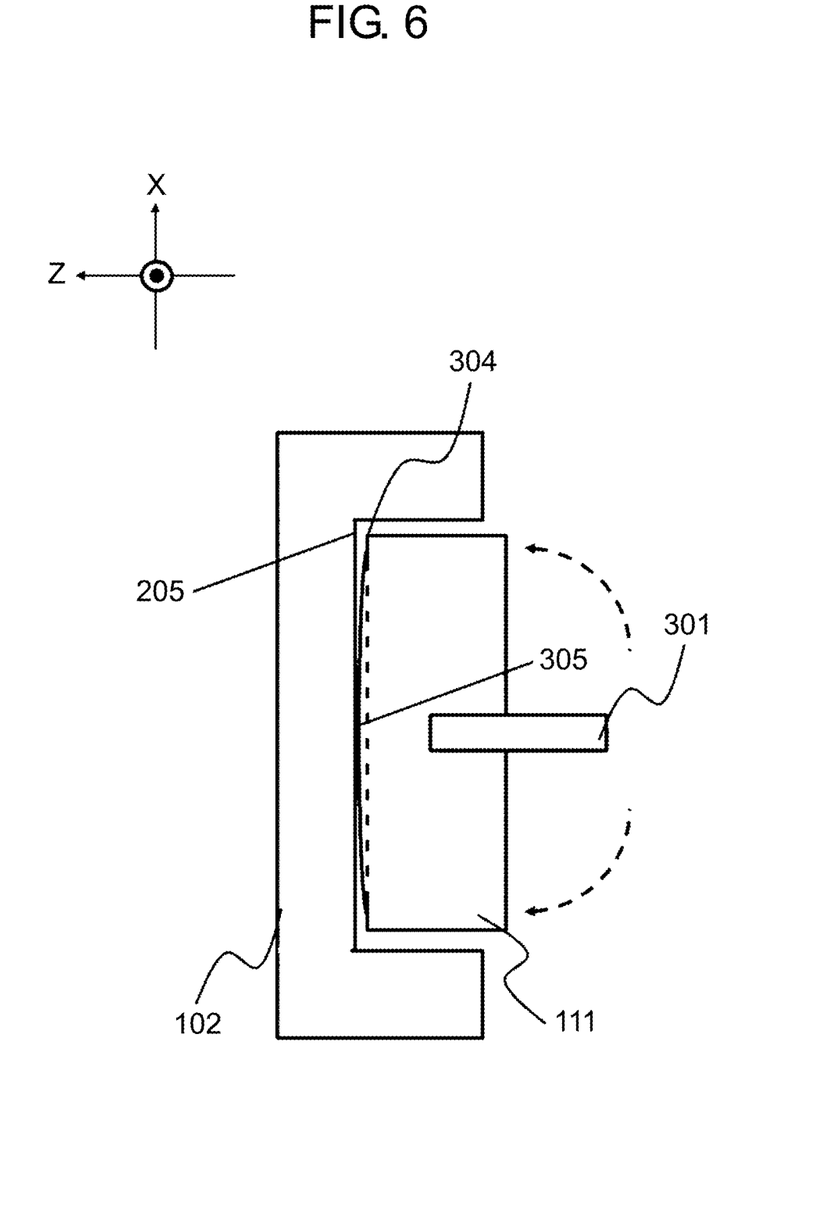
FIG. 6 is an enlarged view of a contact part between the tilt spacer and the optical base.

FIG. 6 is an enlarged view of a contact part between tilt spacer 111 and optical base 102. Optical-base-end arc-shaped projection 305 is shaped to rise gently as compared with semiconductor-laser-end arc-shaped projection 303. Specifically, an area covered by optical-base-end arc-shaped projection 305 in entire optical-base-end counterface 304 is larger than an area covered by semiconductor-laser-end arc-shaped projection 303 in semiconductor-laser-end counterface 302. As such, while optical-base-end arc-shaped projection 305 and semiconductor-laser-end arc-shaped projection 303 rise to the same degree (by the same projecting amount in a Z-plus direction and a Z-minus direction, respectively), there is a difference in gentleness or steepness between the respective projecting amounts of optical-base-end arc-shaped projection 305 and semiconductor-laser-end arc-shaped projection 303.

Although magnitudes of gentleness or steepness are not limited to any specific values in the present exemplary embodiment, these values vary depending on, for example, a wavelength characteristic of light that is output by semiconductor laser 103 used as a light source or where a logical emission point or emission plane is positioned for light that is emitted by semiconductor laser 103 mounted to tilt spacer 111.

Consideration is given to a cut section (hereinafter, a cross section) of tilt spacer 111, having a substantially cylindrical shape, that is circular. In the example of FIG. 2, an X-Y plane is parallel to this cross section. Semiconductor-laser-end counterface 302 and optical-base-end counterface 304 are projected on this cross section. Accordingly, semiconductor-laser-end arc-shaped projection 303 and optical-base-end arc-shaped projection 305 that are respectively provided at these two counterfaces are projected on the cross section. The cross section is concentric with the cylindrical part of tilt spacer 111. When viewed from a center of this cross section, it can be said that a phase difference between respective projection positions of semiconductor-laser-end arc-shaped projection 303 and optical-base-end arc-shaped projection 305 is indicative of relative phase positions of semiconductor-laser-end arc-shaped projection 303 and optical-base-end arc-shaped projection 305 on tilt spacer 111.

In the present exemplary embodiment, the relative phase positions of semiconductor-laser-end arc-shaped projection 303 and optical-base-end arc-shaped projection 305 are not limited to a specific combination. However, it is preferable that semiconductor-laser-end arc-shaped projection 303 and optical-base-end arc-shaped projection 305 be disposed in a substantially orthogonal position relationship.

Thus, tilt spacer 111 can be angularly adjusted with respect to optical base 102 along optical-base-end arc-shaped projection 305 within a predetermined range on an X-Z plane. With optical-base-end arc-shaped projections 305 abutting on the receiving face of stepped hole 205, further entry of tilt spacer 111 in the Z-plus direction is controlled.

With semiconductor-laser-end arc-shaped projections 303 and optical-base-end arc-shaped projections 305 of tilt spacer 111, semiconductor laser 103 can be rotationally adjusted with respect to optical base 102 along directions θx, θy around an X-axis and a Y-axis, respectively. In other words, rotational adjustments of semiconductor laser 103 along directions θx, θy with respect to optical base 102 are achieved by rotation of tilt spacer 111 with respect to optical base 102 on the X-Z plane and rotation of semiconductor laser 103 with respect to tilt spacer 111 on the Y-Z plane.

Not less than a given clearance is provided between a mounting hole of optical base 102 and the outer periphery of tilt spacer 111, between the mounting hole of optical base 102 and the outer periphery of stem 202 of semiconductor laser 103, and between an inner periphery of tilt spacer 111 and an outer periphery of cap 203 of semiconductor laser 103. With these clearances provided, semiconductor laser 103 is susceptible of movement adjustment along the X- and Y-axes with respect to optical base 102 or tilt spacer 111 and is thus susceptible of FFP adjustment and optical axis adjustment.

With suitable setting of the above-described respective projecting amounts of semiconductor-laser-end arc-shaped projection 303 and optical-base-end arc-shaped projection 305, logical emission point 201 and logical emission plane 204 that are shown in FIG. 2 can be seized as references in the above-described angular adjustments along directions θx, θy and the above-described movement adjustments along the X- and Y-axes. For this reason, the respective projecting amounts of semiconductor-laser-end arc-shaped projection 303 and optical-base-end arc-shaped projection 305 may be determined according to respective logically set positions of emission point 201 and emission plane 204.

When assembled to optical base 102, semiconductor laser 103 is optically adjusted via tilt spacer 111. After completion of this adjustment, semiconductor laser 103 is fixed to optical base 102 with an adhesive, for example. In this way, semiconductor laser 103 and optical base 102 are joined directly to each other.

In a prior art, semiconductor laser holder 711 is first fixed to optical base 702, and semiconductor laser 103 is fixed to semiconductor laser holder 711. As such, optical base 702 and semiconductor laser 103 are fixed to each other via, for example, two bonding parts. As compared with cases where there is one joint, reliability, for example is deteriorated.

With the technique disclosed in the present exemplary embodiment, while optical adjustment between semiconductor laser 103 and optical base 102 is carried out via tilt spacer 111, semiconductor laser 103 and optical base 102 are joined directly to each other after the adjustment. As such, in comparison with the prior art, further improvements in qualities such as reliability and durability can be achieved.

In the example explained in the above description, optical-base-end arc-shaped projections 305 are shaped to rise more gently than semiconductor-laser-end arc-shaped projections 303. However, the content disclosed in the present application is not limited to this. Semiconductor-laser-end arc-shaped projections 303 may be shaped to rise more gently than optical-base-end arc-shaped projections 305.

Preferably, the optical-base-end bulging parts are different in shape from the semiconductor-laser-end bulging parts. With the bulging parts rising more gently in shape on one of the sides and rising more steeply in shape on the other side, rotational adjustment of semiconductor laser 103 and direction adjustment of an optical axis can be major when carried out along the steeply rising bulging parts and can be minor when carried out along the gently rising bulging parts.

In the example explained in the above description, the semiconductor-laser-end contact surface and the optical-base-end contact surface are each provided with the two bulging parts; however, the disclosure of the present application is not limited to this. The semiconductor-laser-end contact surface and the optical-base-end contact surface may each be provided with not less than three bulging parts or one bulging part. As another alternative, the semiconductor-laser-end contact surface and the optical-base-end contact surface may have different numbers of bulging parts.

The description of the present exemplary embodiment is based on the premise that tilt spacer 111 has a substantially cylindrical shape. However, the content described in the present application is not limited to an entirely cylindrical shape. For example, tilt spacer 111 may be cylinder-based in shape, but its semiconductor-laser-end opening and optical-base-end opening may not be of equal size. The principle described in the above exemplary embodiment is equally applicable to this case.

In the example explained in the present exemplary embodiment, "the semiconductor-laser-end arc-shaped projection" and "the optical-base-end arc-shaped projection" are both arc-shaped projections; however, the disclosure of the present application is not limited to this. The projections may each have another basic shape such as a triangle-based shape having a rounded apex. In other words, the projections may have any shape so long as their outside shapes are smooth. In this case, "the semiconductor-laser-end arc-shaped projection" and "the optical-base-end arc-shaped projection" that are described in the above exemplary embodiment may be a "semiconductor-laser-end projection" and an "optical-base-end projection", respectively.

In the example explained in the present exemplary embodiment, semiconductor laser 103 is used as the light source; however, the content of the present application is not limited to this. The light source may be another device that can be put to practical use as a light source of an optical pickup. As such, "the semiconductor-laser-end counterface" and "the semiconductor-laser-end arc-shaped projection" that are used in the description of the present exemplary embodiment, for example may be referred to as a "light-source-end counterface" and a "light-source-end arc-shaped projection", respectively.

Figure 7:
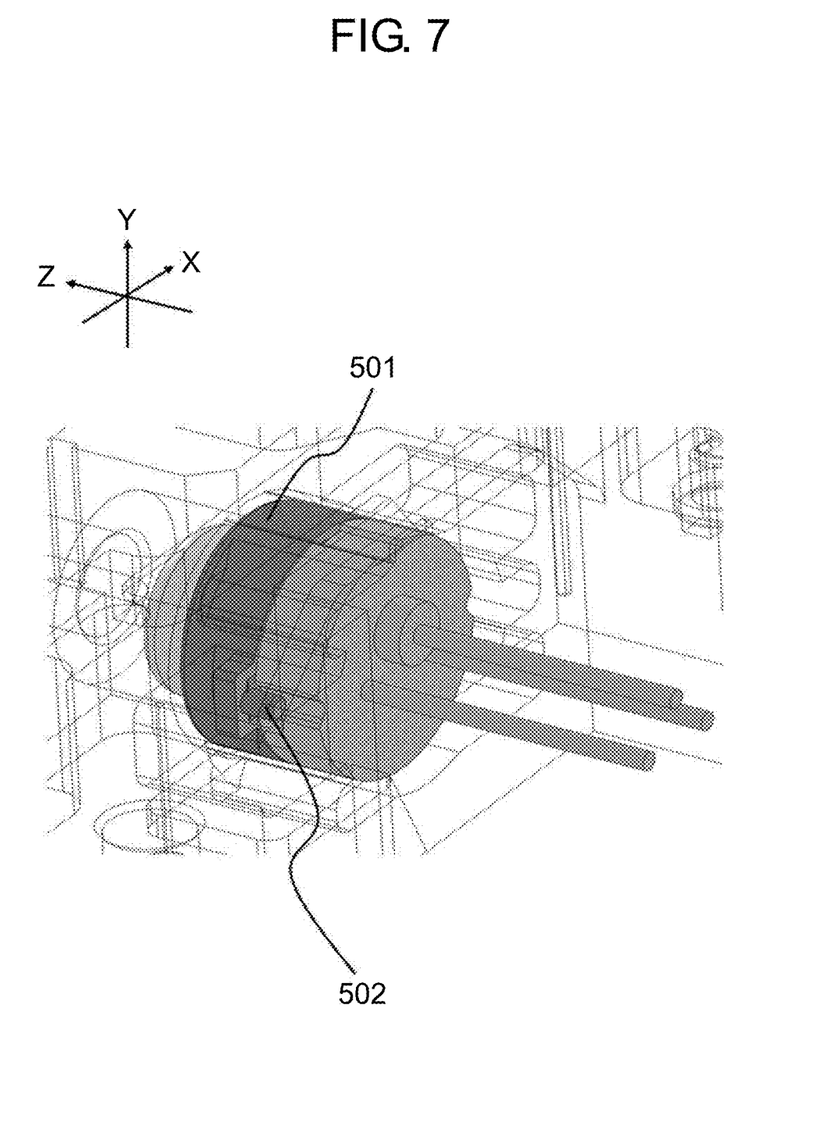
FIG. 7 is a see-through perspective view illustrating an example in which a tilt spacer is assembled according to another exemplary embodiment.
Figure 8:
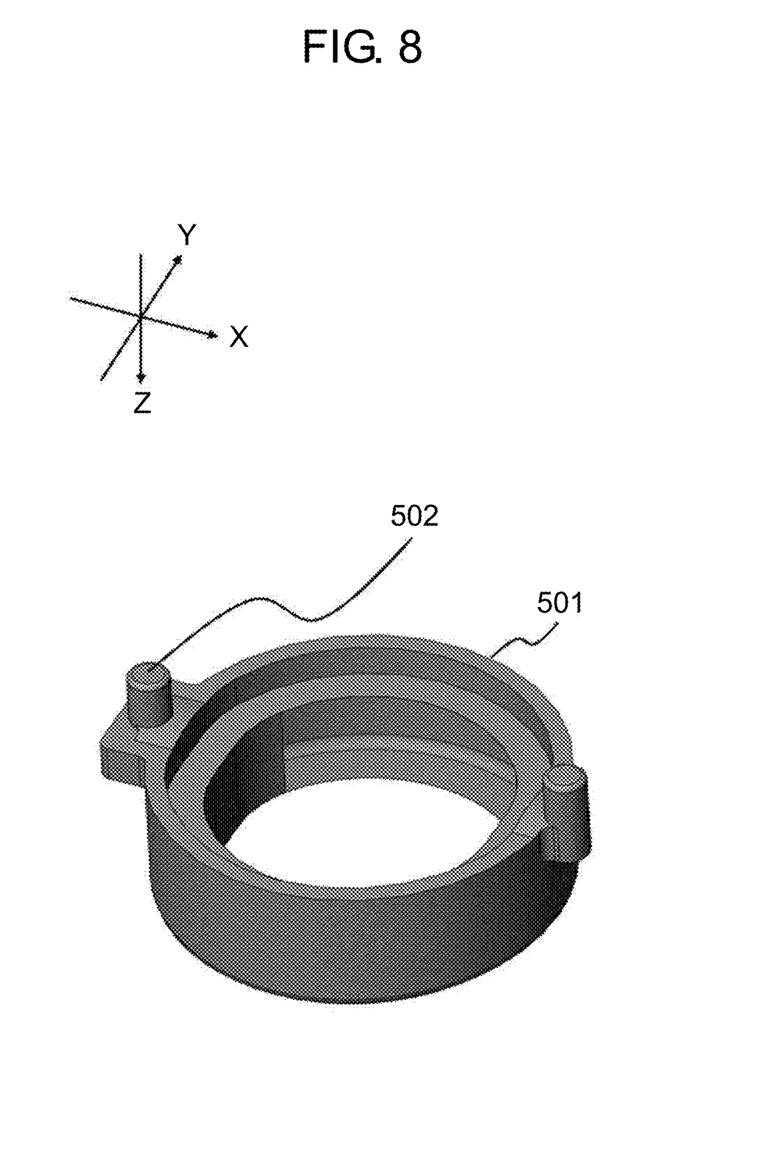
FIG. 8 is a perspective external view of the tilt spacer according to the other exemplary embodiment.

FIG. 7 is a see-through perspective view illustrating an example in which tilt spacer 501 is assembled according to another exemplary embodiment. FIG. 8 is a perspective external view of tilt spacer 501 according to this exemplary embodiment. Tilt spacer 501 differs from tilt spacer 111 in that key projection 301 is replaced by rotation restricting bosses 502 that restrict rotation of tilt spacer 501 around the Z-axis. This exemplary embodiment is otherwise similar to the above exemplary embodiment.

The optical pickup disclosed in the present application includes the light source and the tilt spacer that adjusts a directional characteristic of light that is output by the light source. The optical axis and a position of the light source, for example are adjusted by the tilt spacer. With these adjusted, the light source is fixed directly to the optical base of the optical pickup. The tilt spacer is substantially shaped into a cylinder. The light source is partly inserted into the hollow part of this cylinder. The light-source-end projection provided at the light-source-end counterface that is one of the sides of the cylinder inhibits more insertion of the light source toward the optical base than is necessary and enables rotational adjustment of the optical axis of the light source around the first axis (X-axis) in the predetermined angular range. The optical-base-end projection provided at the optical-base-end counterface that is the other side of the cylinder inhibits more insertion of the tilt spacer mounted with the light source than is necessary and enables rotational adjustment of the optical axis of the light source around the second axis (Y-axis), which is orthogonal to the first axis, in the predetermined angular range. The predetermined clearance is provided between the light source and the tilt spacer as well as between the tilt spacer, which is mounted with the light source, and the optical base, thus enabling adjustment along directions parallel to the plane formed by the first axis and the second axis. After these adjustments are carried out, the semiconductor laser and the optical base are fixed directly to each other.

According to the disclosure of the present application, the light source can have the characteristic of its light, which enters the optical base, adjusted via the tilt spacer with respect to the optical base including at least one optical element. This adjustment enables specified rotational adjustment and specified parallel adjustment with respect to the optical base. Through these adjustments, a desired intensity distribution of the light that enters the optical pickup, for example can be obtained. Because the adjusted light source is fixed directly to the optical base, the optical pickup that can be made has higher reliability than conventional optical pickups.

Other Exemplary Embodiments

The exemplary embodiments are described above as being illustrative of the technique disclosed in the present application. However, the technique of the present disclosure is not limited to these exemplary embodiments and is also applicable to other exemplary embodiments including appropriate changes, replacements, additions, and omissions.

An optical pickup disclosed in the present application can be utilized as, for example, an optical pickup that records information on an optical information recording medium such as an optical disk.

What is claimed is:

1. An optical pickup comprising:
   an optical base mounted with at least one optical element;
   a light source that supplies light incident on the at least one optical element; and
   a tilt spacer that adjusts a characteristic of the light that enters the optical base, the tilt spacer being disposed between the light source and the optical base,
   wherein with the characteristic of the light that enters the optical base adjusted by the tilt spacer, the optical base and the light source are bonded to each other,
   wherein:
   the tilt spacer has a substantially cylindrical shape;
   the light source is partly inserted into a hollow part of the substantially cylindrical shape of the tilt spacer; and
   the tilt spacer includes:
     a light-source-end counterface that faces the light source, the light-source-end counterface being one of two sides of the substantially cylindrical shape;
     an optical-base-end counterface that faces the optical base, the optical-base-end counterface being the other of the two sides of the substantially cylindrical shape;
     a light-source-end projection being a bulging part of the light-source-end counterface, the light-source-end projection rising toward the light source; and
     an optical-base-end projection being a bulging part of the optical-base-end counterface, the optical-base-end projection rising toward the optical base.

2. The optical pickup according to claim 1, wherein when the light-source-end counterface and the optical-base-end counterface are projected on a plane substantially parallel to a cylindrical cross section of the tilt spacer of the substantially cylindrical shape, the light-source-end projection and the optical-base-end projection are projected in different relative phase positions.

3. The optical pickup according to claim 2, wherein the relative phase positions of the light-source-end projection and the optical-base-end projection that are projected are in a substantially orthogonal position relationship.

4. The optical pickup according to claim 1, wherein the light-source-end counterface and the optical-base-end counterface of the tilt spacer of the substantially cylindrical shape respectively have openings of different sizes.

5. An optical pickup comprising:
   an optical base mounted with at least one optical element;
   a light source that supplies light incident on the at least one optical element; and
   a tilt spacer that adjusts a characteristic of the light that enters the optical base, the tilt spacer being disposed between the light source and the optical base,
   wherein the light source has:
     a first area that attaches to the tilt pacer, and
     a second area that is not the first area and is bonded to the optical base with the characteristic of the light that enters the optical base adjusted by the tilt spacer.

6. The optical pickup according to claim 5, wherein when the light-source-end counterface and the optical-base-end counterface are projected on a plane substantially parallel to a cylindrical cross section of the tilt spacer of the substantially cylindrical shape, the light-source-end projection and the optical-base-end projection are projected in different relative phase positions.

7. The optical pickup according to claim 6, wherein the relative phase positions of the light-source-end projection and the optical-base-end projection that are projected are in a substantially orthogonal position relationship.

8. The optical pickup according to claim 5, wherein the light-source-end counterface and the optical-base-end counterface of the tilt spacer of the substantially cylindrical shape respectively have openings of different sizes.

* * * * *